United States Patent
Uleski et al.

[19]

[11] Patent Number: 6,143,999
[45] Date of Patent: Nov. 7, 2000

[54] INSTRUMENT PANEL SWITCH ASSEMBLY CONFIGURED TO REQUIRE LOW INSERTION FORCE AND PROVIDE HIGH RETENTION FORCE

[75] Inventors: Michael A. Uleski, Roseville; Norman J. Becker, East Chin Township, both of Mich.

[73] Assignee: Lear Corporation, Southfield, Mich.

[21] Appl. No.: 09/448,667

[22] Filed: Nov. 24, 1999

[51] Int. Cl.[7] ............................ H01H 19/14; H01H 9/00
[52] U.S. Cl. .......................... 200/296; 200/336; 200/564
[58] Field of Search .................................. 200/50, 11 R, 200/564, 565, 293, 295, 296, 329, 336

[56] References Cited

U.S. PATENT DOCUMENTS

| | | | |
|---|---|---|---|
| 3,674,970 | 7/1972 | Bedocs | 200/168 C |
| 4,731,925 | 3/1988 | Tanishi et al. | 29/840 |
| 4,947,010 | 8/1990 | Heydner et al. | 200/296 |
| 5,810,161 | 9/1998 | Carroll, Jr. | 200/296 |
| 5,924,552 | 7/1999 | Yu | 200/296 |
| 5,954,192 | 9/1999 | Iitsuka | 200/336 |

*Primary Examiner*—Michael Friedhofer
*Attorney, Agent, or Firm*—Brooks & Kushman P.C.

[57] ABSTRACT

A switch assembly is adapted for insertion into an aperture formed in an instrument panel. The aperture has opposing edges. The switch assembly includes a body insertable into the aperture and having opposing sides. A base is connected to the body and includes integrally molded first and second retention arms extending therefrom. Each arm has a first end connected to the base and a second end configured to abut against a respective one of the opposing edges to retain the body in the aperture. Each arm has an upstanding rib between the first and second ends facing the respective opposing side of the body. Each rib extends sufficiently from the respective arm to abut the respective opposing side of the body when the second end of the arm abuts the respective opposing edge, thereby increasing the force required to remove the body from the aperture by forming a fulcrum between the first and second ends of the arms. A rotary potentiometer is housed within the body, and a control knob is engaged with the rotary potentiometer. The control knob has first and second integrally molded radial stopper edges. First and second stop portions are integrally molded with the body and engageable with the first and second stopper edges, respectively, for limiting rotary travel of the potentiometer.

18 Claims, 3 Drawing Sheets

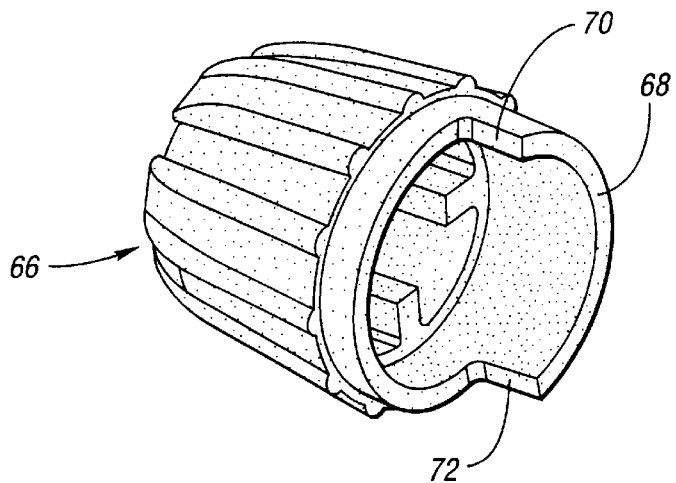
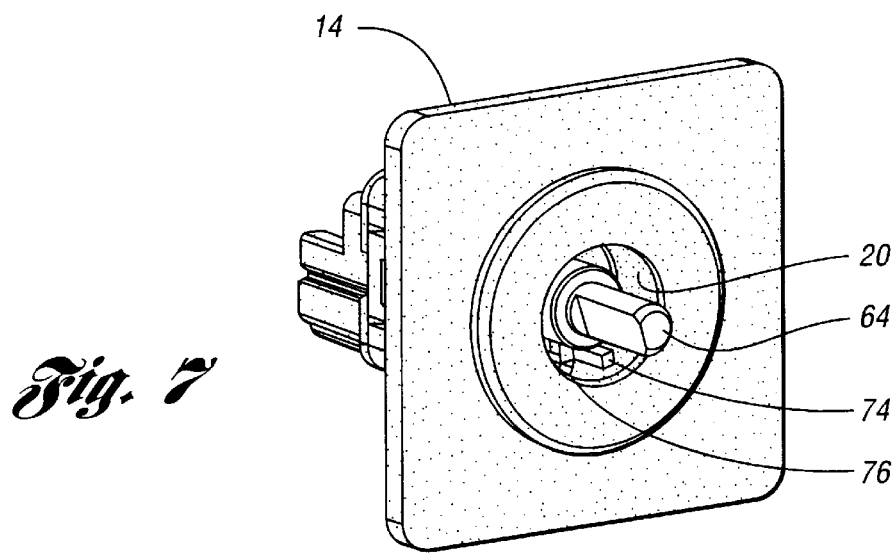
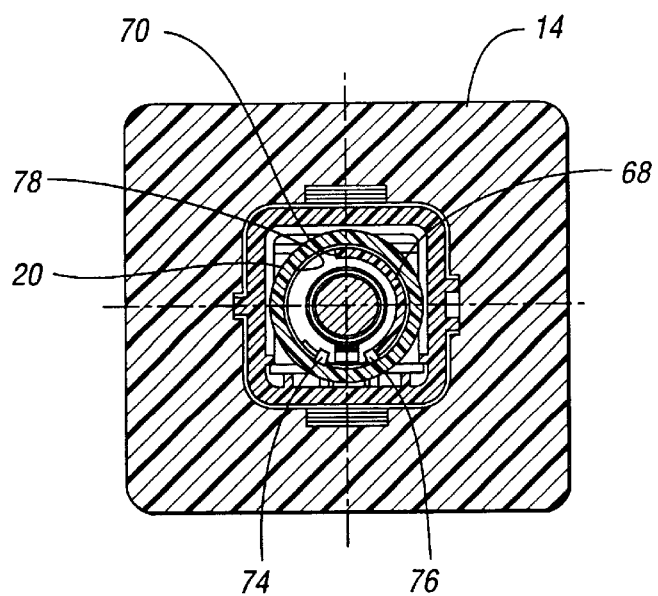

INSTRUMENT PANEL SWITCH ASSEMBLY CONFIGURED TO REQUIRE LOW INSERTION FORCE AND PROVIDE HIGH RETENTION FORCE

TECHNICAL FIELD

The present invention relates to a switch assembly adapted for insertion into an aperture formed in an instrument panel, wherein the switch assembly includes retention arms with fulcrum ribs operative to increase the force required to remove the switch assembly from the instrument panel aperture while maintaining a low insertion force.

BACKGROUND ART

Vehicle instrument panels typically include numerous switches, such as variable potentiometers, which are inserted through apertures formed in the instrument panel and are electrically connected for providing various electrical operations in the vehicle, such as instrument panel light dimming, heating ventilation and air conditioning (HVAC) control, etc. These switches typically include a metal spring installed with the switch which engages the rear surface of the instrument panel for retaining the switch in the instrument panel aperture. Typically, the switch assemblies are installed in the vehicle by hand, therefore low insertion forces are required. Additionally, electrical connectors are subsequently attached to the rear of the switch assembly once it has been installed in the instrument panel aperture, therefore high retention forces are required to prevent inadvertent removal during such subsequent attachment. For example, typically at least approximately 80 Newtons of minimum push-out force is required to prevent unwanted detachment of the switch assembly from the instrument panel aperture. An additional requirement for such switch assemblies is that they must be removable for servicing.

A problem with the metal springs referenced above is that they add cost by requiring the manufacture, handling and assembly of such spring components.

Accordingly, it is desirable to eliminate the metal spring from the assembly to reduce cost while maintaining low insertion forces and high retention forces.

Another problem addressed by the present invention is that of the limitations of rotary potentiometers used in vehicle instrument panels, such as for dimmer switches. The rotary potentiometers used in vehicle instrument panel assemblies are similar to those of home audio systems, which do not have significant customer torque requirements. However, in a vehicle, substantial torque resistance is required. It is therefore desirable to provide an improved switch assembly which provides substantially improved torque resistance to enable use of such a potentiometer in a vehicle.

DISCLOSURE OF INVENTION

The present invention overcomes the above-referenced shortcomings of prior art switch assemblies by providing a switch assembly with integrally molded retention arms having a fulcrum rib to provide high retention forces while maintaining low insertion forces.

More specifically, the present invention provides a switch assembly adapted for insertion into an aperture formed in an instrument panel, wherein the aperture has opposing edges. The switch assembly includes a body insertable into the aperture and having opposing sides. A base is connected to the body for insertion therewith, and has integrally molded first and second retention arms extending from the base. Each arm has a first end connected to the base and a second end configured to abut against a respective one of the opposing edges to retain the body and base in the aperture. Each arm has an upstanding rib between the first and second ends facing the respective opposing side of the body. Each rib extends sufficiently from the respective arm to abut the respective opposing side of the body when the second end of the arm abuts the respective opposing edge, thereby increasing the force required to remove the body from the aperture by forming a fulcrum between the first and second ends of the arms.

Alternatively, the fulcrum ribs may extend from the opposing sides of the body for engagement with the retention arms, rather than vice-versa.

Another aspect of the invention provides a rotary potentiometer housed within the body and a control knob engaged with the rotary potentiometer. The control knob has first and second integrally molded radial stopper edges. First and second stop portions are integrally molded with the body and engageable with the first and second stopper edges, respectively, for limiting rotary travel of the potentiometer.

Accordingly, an object of the invention is to provide an improved switch assembly for a vehicle instrument panel in which the metal spring is eliminated while maintaining low insertion forces and high retention forces.

Another object of the invention is to provide an improved switch assembly including molded retention arms cooperating with molded fulcrum ribs to provide low insertion forces and high retention forces.

Another object of the invention is to provide an improved switch assembly including integrally molded stopper edges and stop portions to provide improved rotary torque resistance.

The above objects and other objects, features, and advantages of the present invention are readily apparent from the following detailed description of the best modes for carrying out the invention when taken in connection with the accompanying drawings.

BRIEF DESCRIPTION OF DRAWINGS

FIG. 6 shows a perspective view of a control knob in accordance with the present invention;

FIG. 7 shows a front perspective view of a switch assembly as shown in FIG. 4 with the control knob removed; and FIG. 8 shows a vertical cross-sectional view of the switch assembly of FIG. 4.

BEST MODES FOR CARRYING OUT THE INVENTION

Figure 2:
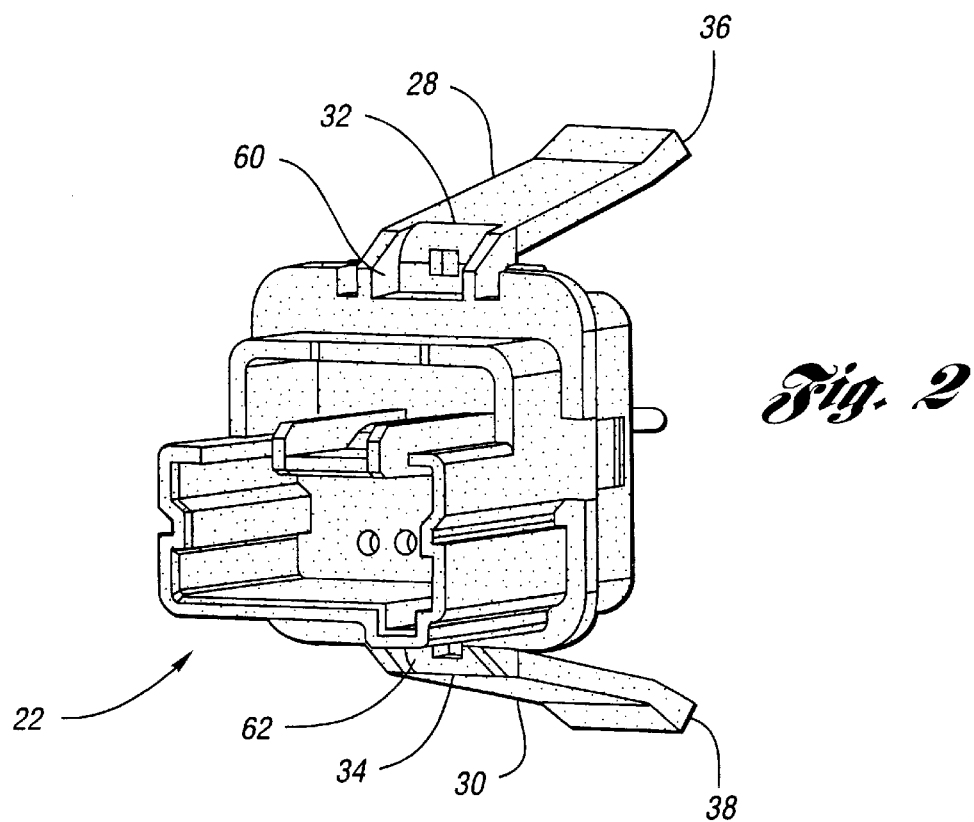
FIG. 2 shows a reverse perspective view of the base of FIG. 1.
Figure 3:
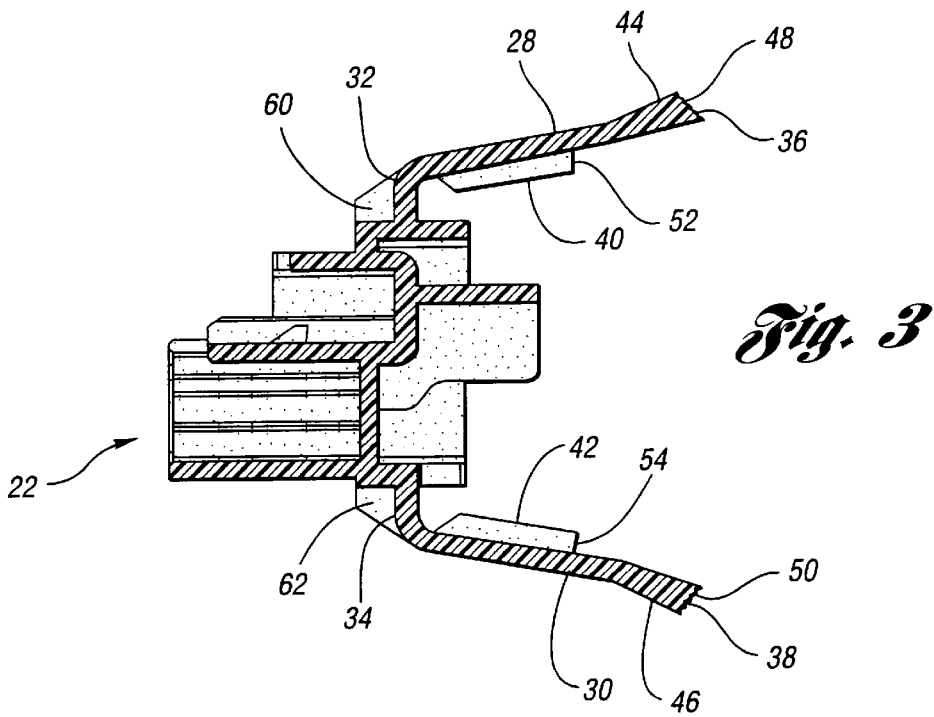
FIG. 3 shows a longitudinal cross-sectional view of the base of FIG. 1.
Figure 4:
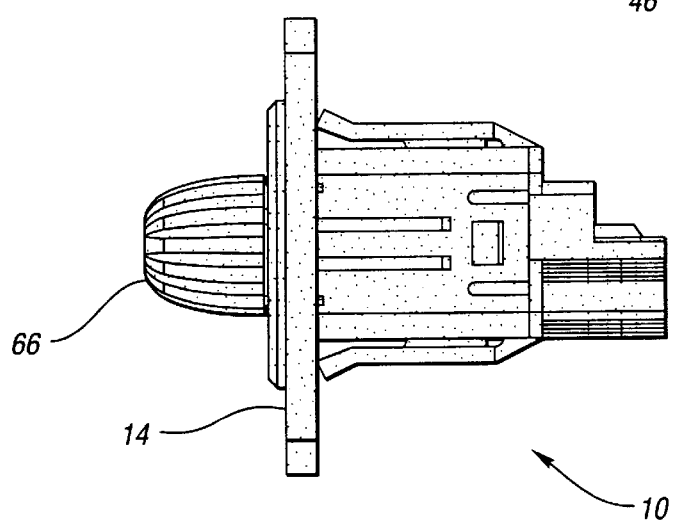
FIG. 4 shows a side view of a switch assembly installed in an instrument panel aperture in accordance with the present invention.
Figure 5:
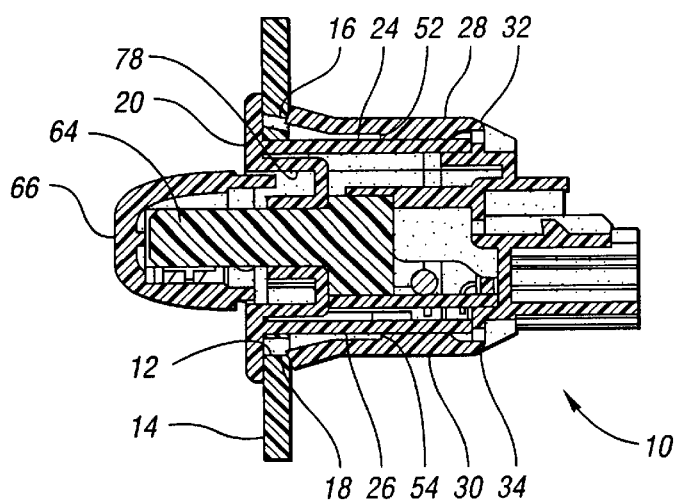
FIG. 5 shows a longitudinal cross-sectional view of the assembly of FIG. 4.

Referring to FIGS. 1–5, a switch assembly 10 is shown and described herein in accordance with the present invention. As shown in FIGS. 4 and 5, the switch assembly 10 is adapted for insertion into an aperture 12 formed in an instrument panel 14 for use as an instrument panel dimmer switch, for example. The instrument panel aperture 12 has opposing edges 16,18.

The switch assembly includes a body 20 which is connected to a base 22. The body 20 has opposing sides 24,26 which are generally flat.

The base 22 is an injection molded plastic component including integrally molded first and second retention arms 28,30. Each arm has a first end 32,34, respectively, connected to the base 22, and a second end 36,38, respectively, configured to abut against a respective one of the opposing edges 16,18 of the aperture 12 when the switch assembly 10 is inserted through the aperture 12 in the instrument panel 14 in order to retain the switch assembly 10 in the aperture 12.

Figure 1:
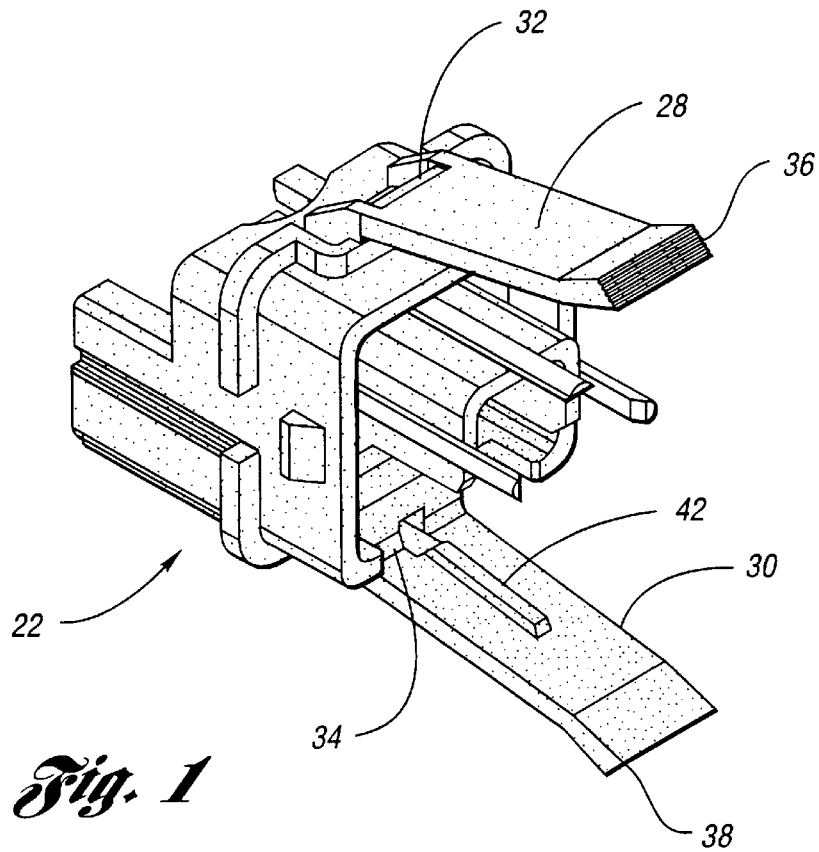
FIG. 1 is a perspective view of a base portion of a switch assembly in accordance with the present invention.

As most clearly shown in FIGS. 1 and 3, each arm 28,30 includes an upstanding rib 40,42 between the first and second ends 32, 36, 34, 38, respectively, which is positioned for facing the respective opposing side 24,26 of the body 20 when the base 22 is connected to the body 20.

As shown in FIG. 3, the retention arms 28,30 are angled away from each other, which provides an outward spring load when the arms are compressed inward by insertion through the aperture 12 of the instrument panel 14. Accordingly, the retention arms 28,30 are movable between the position shown in FIG. 3 in which the arms angle outwardly and the assembled position shown in FIG. 5, wherein the arms 28,30 are substantially parallel with the respective opposing sides 24,26 of the body 20.

As the switch assembly 10 is inserted into the aperture 12, the retention arms 28,30 are flexibly pivoted about their respective first ends 32,34 as a result of engagement of the retention arms 28,30 with the opposing edges 16,18 of the aperture 12. Accordingly, as the switch assembly 10 is inserted through the aperture 12, an increasingly longer moment arm is provided between the pivot point 32,34 and the point along the arms 28,30 at which the arms contact the respective opposing edges 16,18 of the aperture, which results in a low insertion force for the switch assembly 10.

As shown most clearly in FIG. 3, the respective second end 36,38 of each retention arm 28,30 includes a lead-in ramp 44,46, and a retention ramp 48,50. As the switch assembly 10 is inserted through the aperture 12, each of the upstanding ribs 40,42 extends sufficiently from the respective arm 28,30 to abut the respective opposing side 24,26 of the body 20 as the lead-in ramp 44,46 of each retention arm 28,30 engages the respective opposing edge 16,18 of the aperture 12. At this point, the forward edge 52,54 of each upstanding rib 40,42 forms a fulcrum between the first and second ends 32, 36, 34, 38, respectively, of the arms 28,30, thereby increasing the force required to remove the switch assembly 10 from the aperture 12.

Also, the upstanding ribs 40,42 are sufficiently short such that the ribs 40,42 do not engage the respective opposing side 24,26 of the body 20 until the lead-in ramp 44,46 of the respective arms 28,30 engage the respective opposing edge 16,18 of the aperture 12 during insertion, thereby maintaining the low insertion force required to insert the body 20 and base 22 into the aperture.

As shown in FIG. 3, each upstanding rib 40,42 is spaced slightly from the respective first end 32,34 of the retention arms 28,30. Of course, various configurations for the upstanding ribs 40,42 could be used. For example, the ribs could merely be a post or pin. Also, the ribs could extend from the opposing sides 24,26 of the body 20, rather than extending from the retention arms 28,30.

As shown in FIGS. 2 and 3, the retention arms 28,30 include a hollowed portion 60,62 on an outer side of each retention arm 28,30 for increased flexibility of the retention arms 28,30 at the respective first ends 32,34. This increased flexibility contributes to the low insertion force provided by the design.

A second aspect of the invention is shown and described with reference to FIGS. 4–8. As shown, the switch assembly includes a rotary potentiometer knob 64 which is connected to a plastic control knob 66. As shown in FIG. 6, the control knob 66 includes an integrally molded curved rib 68 which forms first and second radial stopper edges 70,72.

Turning to FIG. 7, the body 20 includes integrally molded first and second stop ribs 74,76 operative as stop portions which are engageable with the radial stopper edges 70,72 for limiting rotary travel of the potentiometer knob 64. As shown in FIG. 8, the curved rib 68 is engaged within the aperture 78 formed by the body 20. The curved rib 68 is slidable along the aperture 78 between a first position shown in FIG. 8, wherein the stopper edge 72 engages the stop rib 74, and a second position in which the stopper edge 70 engages the stop rib 76. Accordingly, the degree of rotary movement allowed by this configuration is limited by the length of the curved rib 68 and the positioning of the stop ribs 74,76. This design provides significantly improved torque resistance as a result of the strength of the ribs 68, 74, 76. Accordingly, home audio type rotary potentiometers may be used in a vehicle instrument panel application, and such rotary potentiometers need not have built-in radial stops.

The described invention can be adapted for radial displacement control stops to 360° endless rotational encoders, which can be integrated into an automotive environment. These encoders can rotate around their axes continuously without stops. The described invention allows usage of a specific portion of a gray code without using all combinations, working with specific detent positions; such as a 12 position 30° step angle (360°) device using positions 4–8 only with integration of rotary torque control and positive end stops. The knob stop-controlling feature will allow an inclusive angle of 120° of the encoder to be utilized (five detent positions). The rotary control feature is not limited to horizontal mounting (parallel to circuit board) but can also be used for a vertical mount position encoder (perpendicular to circuit board).

While the best mode for carrying out the invention has been described in detail, those familiar with the art to which this invention relates will recognize various alternative designs and embodiments for practicing the invention within the scope of the appended claims.

What is claimed is:

1. A switch assembly insertable into an aperture formed in an instrument panel, the aperture having opposing edges, the switch assembly comprising:

a body insertable into the aperture and having opposing sides;

a base connected to the body and insertable with the body, said base having integrally molded first and second retention arms extending therefrom, each of said first and second retention arms having a first end connected to the base and a second end configured to abut against a respective one of said opposing edges to retain the body and base in the aperture; and each of said first and second retention arms having an upstanding rib between the first and second ends facing a respective opposing side of the body, each upstanding rib extending sufficiently from a respective one of the first and second retention arms to abut the respective opposing side of the body when the second end of the arm abuts the respective one of said opposing edges, thereby increasing an amount of force required to remove the body from the aperture by forming a fulcrum between the first and second ends of the arms.

2. The switch assembly of claim 1, wherein the second end of each retention arm includes a lead-in ramp, and each said upstanding rib is sufficiently short such that said upstanding rib does not engage the respective opposing side of the body until the lead-in ramp engages the respective one of said opposing edges of the aperture as the body and base are inserted into the aperture, thereby maintaining a low insertion force required to insert the body and base into the aperture.

3. The switch assembly of claim 2, wherein the second end of each retention arm includes a retention ramp slanted in a direction opposite the respective lead-in ramp.

4. The switch assembly of claim 1, wherein each said upstanding rib is spaced away from the first end of the respective retention arm.

5. The switch assembly of claim 1, further comprising:
   a rotary potentiometer housed within the body;
   a control knob engaged with the rotary potentiometer and having first and second integrally molded radial stopper edges; and
   first and second stop portions integrally molded with the body and engageable with the first and second stopper edges, respectively, for limiting rotary travel of the potentiometer.

6. The switch assembly of claim 5, wherein said radial stopper edges are formed by a curved rib, and said first and second stopper edges are formed by first and second stop ribs.

7. The switch assembly of claim 1, wherein the first and second retention arms are angled away from the body to spring-bias the second ends of the arms away from the body when compressed together.

8. The switch assembly of claim 1, wherein the first end of each retention arm includes a hollowed portion on an outer side thereof for increased flexibility of the retention arms.

9. A switch assembly insertable into an aperture formed in an instrument panel, the aperture having opposing edges, the switch assembly comprising:
   a body insertable into the aperture and having opposing sides;
   a base connected to the body and having integrally molded first and second retention arms extending therefrom, each of said first and second retention arms having a first end connected to the base and a second end configured to abut against a respective one of said opposing edges to retain the body in the aperture; and
   a rib upstanding from one of the body and a respective one of the retention arms for abutting the other of the body and the respective one of the retention arms at each of the opposing sides of the body, each said rib extending sufficiently from said one to abut said other when the second end of the respective one of the retention arms abuts the respective opposing edge, thereby increasing an amount of force required to remove the body from the aperture by forming a fulcrum between the first and second ends of each of the first and second retention arms.

10. The switch assembly of claim 9, wherein said one comprises the respective one of the retention arms, and said other comprises the body.

11. The switch assembly of claim 10, wherein the second end of each retention arm includes a lead-in ramp, and each said rib is sufficiently short such that the rib does not engage a respective opposing side until the lead-in ramp engages the respective edge of the aperture as the body and base are inserted into the aperture, thereby maintaining a low insertion force required to insert the body and base into the aperture.

12. The switch assembly of claim 11, wherein the second end of each retention arm includes a retention ramp slanted in a direction opposite the respective lead-in ramp.

13. The switch assembly of claim 10, wherein each said rib is spaced away from the first end of the respective retention arm.

14. The switch assembly of claim 10, further comprising:
   a rotary potentiometer housed within the body;
   a control knob engaged with the rotary potentiometer and having first and second integrally molded radial stopper edges; and
   first and second stop portions integrally molded with the body and engageable with the first and second stopper edges, respectively, for limiting rotary travel of the potentiometer.

15. The switch assembly of claim 14, wherein said radial stopper edges are formed by a curved rib, and said first and second stopper edges are formed by first and second stop ribs.

16. The switch assembly of claim 10, wherein the first and second retention arms are angled away from the body to spring-bias the second ends of the arms away from the body when compressed together.

17. A switch assembly insertable into an aperture formed in an instrument panel, the switch assembly comprising:
   a body insertable into the aperture;
   a rotary potentiometer housed within the body;
   a control knob engaged with the rotary potentiometer and having first and second integrally molded radial stopper edges; and
   first and second stop portions integrally molded with the body and engageable with the first and second stopper edges, respectively, for limiting rotary travel of the potentiometer.

18. The switch assembly of claim 17, wherein said radial stopper edges are formed by a curved rib, and said first and second stopper edges are formed by first and second stop ribs.

* * * * *